US012794206B2

(12) United States Patent
Meng et al.

(10) Patent No.: US 12,794,206 B2
(45) Date of Patent: Nov. 10, 2026

(54) WIRE HARNESS ORGANIZER STRUCTURE AND DISPLAY DEVICE

(71) Applicants: K-Tronics (Suzhou) Technology Co., Ltd., Suzhou (CN); BOE Technology Group Co., Ltd., Beijing (CN)

(72) Inventors: Yuan Meng, Beijing (CN); Bin Wei, Beijing (CN); Di Wang, Beijing (CN)

(73) Assignees: K-TRONICS (SUZHOU) TECHNOLOGY CO., LTD., Suzhou (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 493 days.

(21) Appl. No.: 18/277,985

(22) PCT Filed: Nov. 19, 2021

(86) PCT No.: PCT/CN2021/131919

§ 371 (c)(1),
(2) Date: Jan. 11, 2024

(87) PCT Pub. No.: WO2023/087281

PCT Pub. Date: May 25, 2023

(65) Prior Publication Data

US 2025/0246891 A1 Jul. 31, 2025

(51) Int. Cl.
*H02G 11/00* (2006.01)
*F16M 11/04* (2006.01)
*H01B 7/00* (2006.01)

(52) U.S. Cl.
CPC ......... *H02G 11/006* (2013.01); *F16M 11/046* (2013.01); *H01B 7/0045* (2013.01)

(58) Field of Classification Search
CPC ........ H02G 11/006; H02G 11/00; A47B 9/00; A47B 21/00; F16G 13/16; F16M 11/046; H01B 7/0045
(Continued)

(56) References Cited

U.S. PATENT DOCUMENTS 4,658,577 A 4/1987 Klein
5,638,672 A * 6/1997 Furukawa .............. F16G 13/16 59/78.1
(Continued)

FOREIGN PATENT DOCUMENTS

CN 201475252 U 5/2010
CN 102403685 A 4/2012
(Continued)

OTHER PUBLICATIONS

CN202180003470.1 First office action issued on Sep. 30, 2025.

*Primary Examiner* — Timothy J Thompson
*Assistant Examiner* — Michael F Mcallister
(74) *Attorney, Agent, or Firm* — IPro, PLLC

(57) ABSTRACT

A wire harness arranging structure and a display device. The structure comprises a hinge (4) and a wire harness (3) for conducting electricity. The hinge (4) is configured to be capable of being bent in a specified plane, and the hinge (4) has a hollow portion penetrating from a first end (41) to a second end (42) of the hinge (4); the wire harness (3) passes through the hollow portion. By means of the technical solution, the problem that wires are tangled, knotted or even jammed can be avoided.

17 Claims, 6 Drawing Sheets

(58) Field of Classification Search
USPC .......................................................... 174/69
See application file for complete search history.

(56) References Cited

U.S. PATENT DOCUMENTS

| | | | | |
|---|---|---|---|---|
| 6,065,278 | A * | 5/2000 | Weber .................. | H02G 11/006<br>248/51 |
| 7,017,328 | B2 * | 3/2006 | Komiya ............... | H02G 11/006<br>59/900 |
| 7,387,046 | B2 * | 6/2008 | Ikeda ...................... | F16G 13/16<br>59/78.1 |
| 9,150,168 | B2 * | 10/2015 | Inoue ................... | H02G 3/0406 |
| 9,551,399 | B2 * | 1/2017 | Tseng ....................... | H02G 3/04 |
| 2016/0258509 | A1 * | 9/2016 | Tseng ...................... | F16G 13/16 |
| 2018/0184800 | A1 | 7/2018 | Yamamoto et al. | |
| 2022/0144190 | A1 * | 5/2022 | Isoda .................. | B60R 16/0215 |

FOREIGN PATENT DOCUMENTS

| | | | |
|---|---|---|---|
| CN | 204360274 | U | 5/2015 |
| CN | 205207542 | U | 5/2016 |
| CN | 205745106 | U | 11/2016 |
| CN | 107084300 | A | 8/2017 |
| CN | 107708485 | A | 2/2018 |
| CN | 109340314 | A | 2/2019 |
| CN | 110652316 | A | 1/2020 |
| CN | 212203698 | U | 12/2020 |
| CN | 213809550 | U | 7/2021 |
| DE | 102015005749 | A1 | 1/2016 |
| JP | H11249577 | A | 9/1999 |
| JP | 2006182237 | A | 7/2006 |

* cited by examiner

WIRE HARNESS ORGANIZER STRUCTURE AND DISPLAY DEVICE

CROSS-REFERENCE TO RELATED APPLICATION

The present disclosure is a U.S. national stage of international application No. PCT/CN2021/131919, filed on Nov. 19, 2021, the content of which is herein incorporated by reference in its entirety.

TECHNICAL FIELD

The present disclosure relates to the field of display technologies, and in particular, relates to a wire harness organizer structure and a display device.

BACKGROUND

Displays on the market nowadays are typically equipped with liftable stands. That is, a height of a display panel is adjusted by providing a lifting structure on the stand.

SUMMARY

Some embodiments of the present disclosure provide a wire harness organizer structure and a display device.

According to some embodiments of the present disclosure, a wire harness organizer structure is provided. The wire harness organizer structure includes a hinge and a wire harness configured for electrical conduction; wherein the hinge is bendable in a specified plane and has a hollow portion communicating a first end of the hinge to a second end of the hinge, and the wire harness runs through the hollow portion.

In some embodiments, the first end of the hinge is a fixed end, the second end of the hinge is a moving end, and a fixed portion is arranged at a position, at a specified length from the first end, of the hinge, wherein the fixed portion is immovable relative to the first end;

wherein a portion, between the fixed portion and the first end, of the hinge is a first portion, a portion, between the fixed portion and the second end, of the hinge is a second portion, and the fixed portion is configured to define the second portion to be bent in the specified plane, the specified plane being parallel to a movement direction of the second end of the hinge.

In some embodiments, the hinge includes a first segment and a second segment, wherein a connection position between the first segment and the second segment is disposed in the second portion, the first segment is unidirectionally bent in the specified plane along a first direction, and the second segment is unidirectionally bent in the specified plane along a second direction, the second direction being opposite to the first direction.

In some embodiments, an included angle between an extension direction of the first segment and the movement direction of the second end of the hinge is greater than or equal to 0° and is less than or equal to 90°.

In some embodiments, a length of the first portion is greater than or equal to one-third of a length of the second portion and is less than or equal to one-half of the length of the second portion.

In some embodiments, the hinge, in a most compressed state, has a projection with a maximum area on a plane, and the projection is Z-shaped or S-shaped.

In some embodiments, a length of the hinge ranges from 150 mm to 180 mm.

In some embodiments, the hinge includes a plurality of hinge blocks successively connected in series, wherein each of the hinge blocks includes a first hinge sub-block and a second hinge sub-block connected as one; wherein in any adjacent three of the hinge blocks, the first hinge sub-block of the hinge block in the middle and the second hinge sub-block of one of the adjacent three hinge blocks adjacent to the hinge block in the middle are rotatably connected to each other in the specified plane, and the second hinge sub-block of the hinge block in the middle and the first hinge sub-block of the other hinge block adjacent to the hinge block in the middle are rotatably connected to each other in the specified plane.

In some embodiments, for each of the hinge blocks, a rotation shaft portion is arranged on one of the first hinge sub-block and the second hinge sub-block, and a rotation shaft hole is arranged in the other of the first hinge sub-block and the second hinge sub-block, wherein the rotation shaft portion is rotatably connected to the corresponding rotation shaft hole and an axis of the rotation shaft portion is perpendicular to the specified plane.

In some embodiments, for each of the hinge blocks, a first limiting portion is arranged on one of the first hinge sub-block and the second hinge sub-block, and a second limiting portion is arranged on the other of the first hinge sub-block and the second hinge sub-block, wherein the first limiting portion cooperates with the corresponding second limiting portion to define a maximum angular extent to which adjacent two of the hinge blocks rotate about the axis of the rotation shaft portion in the specified plane.

In some embodiments, an angle at which two adjacent of the hinge blocks rotate about the axis of the rotation shaft portion in the specified plane from an initial state toward the maximum angular extent is greater than an angle at which the two adjacent hinge blocks rotate about the axis of the rotation shaft portion in the specified plane toward a direction going away from the maximum angular extent.

In some embodiments, the first limiting portion is a first limiting surface on one of the first hinge sub-block and the second hinge sub-block, and the second limiting portion is a second limiting surface on the other of the first hinge sub-block and the second hinge sub-block.

In some embodiments, for each of the hinge blocks, the first hinge sub-block includes two first walls opposite to each other along a direction parallel to the axis of the rotation shaft portion, and the second hinge sub-block includes two second walls opposite to each other along the direction parallel to the axis of the rotation shaft portion, wherein the two first walls are respectively connected as one to the two second walls; and each of the hinge blocks further includes two connection portions connected between the two first walls and the two second walls, and the hollow portion is formed between the two connection portions, the two first walls, and the two second walls.

In some embodiments, for each of the hinge blocks, a surface, going away from the other first wall, of one of the first walls is a first surface, and a surface, going away from the other second wall, of one of the second walls is a second surface, wherein the second surface of one of the second walls protrudes, relative to the first surface of the first wall connected as one to the second wall, along a direction away from the first surface;

in any adjacent two of the hinge blocks, the second surface of the second wall of one of the hinge blocks is flush with the second surface of the second wall of the other hinge block; and the rotation shaft hole is a through-hole opened through the second wall along a direction of the axis of the rotation shaft portion, and the rotation shaft portion is a convex portion on the first surface of the first wall.

In some embodiments, each of the second walls has an arc-shaped concave surface and an arc-shaped convex surface that are going away from each other, wherein in any adjacent two of the hinge blocks, the arc-shaped concave surface of the second wall of one of the hinge blocks cooperates with the arc-shaped convex surface of the second wall of the other hinge block.

In some embodiments, for each of the hinge blocks, a surface, going away from the other first wall, of one of the first walls is a first surface, and a surface, going away from the other second wall, of one of the second walls is a second surface, wherein the first surface of one of the first walls protrudes, relative to the second surface of the second wall connected as one to the first wall, along a direction away from the second surface;

in any adjacent two of the hinge blocks, the first surface of the first wall of one of the hinge blocks is flush with the first surface of the first wall of the other hinge block; and the rotation shaft hole is a through-hole opened through the first wall along a direction of the axis of the rotation shaft portion, and the rotation shaft portion is a convex portion on the second surface of the second wall.

In some embodiments, each of the first walls has an arc-shaped concave surface and an arc-shaped convex surface that are going away from each other, wherein in any adjacent two of the hinge blocks, the arc-shaped concave surface of the first wall of one of the hinge blocks cooperates with the arc-shaped convex surface of the first wall of the other hinge block.

According to some embodiments of the present disclosure, a display device is provided. The display device includes a display panel and a stand configured to support the display panel, wherein a lifting structure configured to adjust a height of the display panel is up and down movably arranged on the stand, and an electronic module is arranged in the stand. The display device further includes the wire harness organizer structure as described above, wherein the electronic module is electrically connected to a functional module in the display panel by a wire harness; and a first end of a hinge is connected to the stand, and a second end of the hinge is connected to the lifting structure.

In some embodiments, fixing terminals are arranged on the first end and second end of the hinge, at least one mounting hole being arranged in each of the fixing terminals, and the wire harness organizer structure further includes fastening screws, a number of the fastening screws being equal to a total number of the mounting holes in all the fixing terminals, and each of the fastening screws running through the mounting hole in one-to-one correspondence and being connected to the stand or the lifting structure by threads.

DETAILED DESCRIPTION

Figure 1:
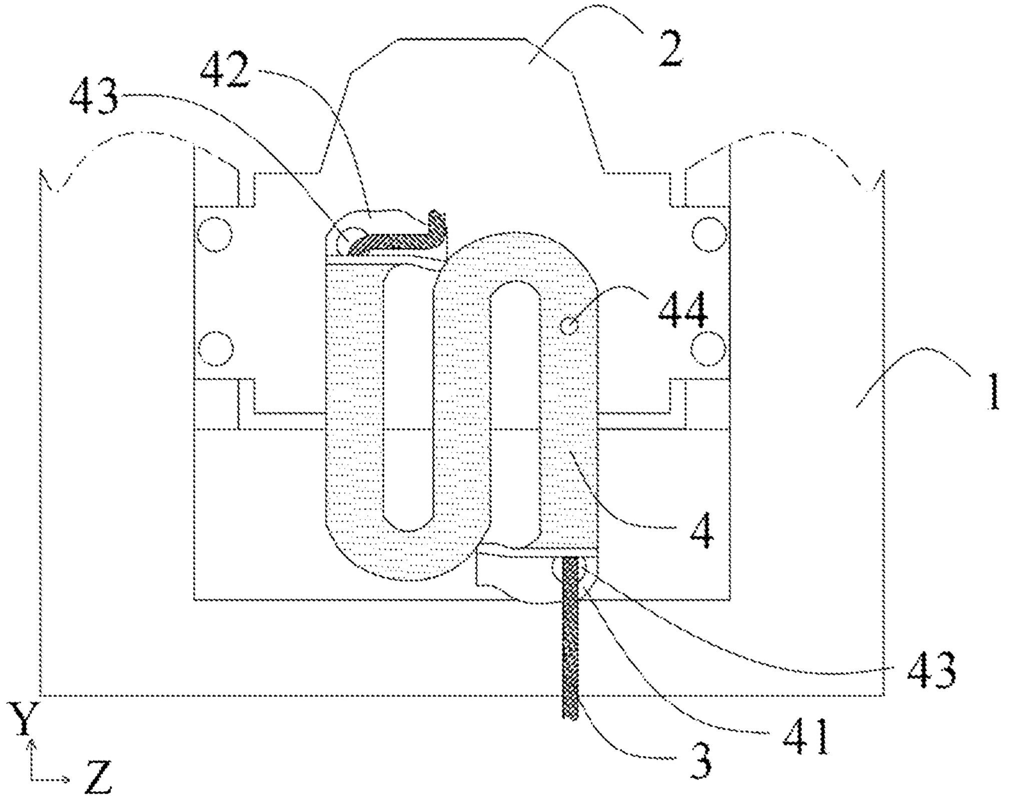
FIG. 1 is a schematic structural diagram of a stand of a display device according to some embodiments of the present disclosure.

The present disclosure is described in further detail with reference to the accompanying drawings, to clearly present the objects, technical solutions, and advantages of the present disclosure.

Electronic modules (i.e., an electronic element assembly such as a mainboard and an interface board, configured to drive an operation of a screen, transmit signals, and display images) are generally placed in a back structure of the display.

There are also some displays where at least a portion of the electronic modules are placed inside the stand, and the electronic modules are connected to functional modules (e.g., a backlight, a low-voltage differential signal, and a lens lamp) in the display panel by wires. However, during a process of raising and lowering the display panel relative to the stand, the wires are usually wound and twisted, knotted, or even stuck, which leads to a failure to raise or lower the display panel.

Some embodiments of the present disclosure provide a wire harness organizer structure including a hinge and a wire harness used for electrical conduction. The hinge is bendable in a specified plane, and the hinge has a hollow portion communicating a first end of the hinge to a second end of the hinge. The wire harness runs through the hollow portion. The wire harness is configured to perform the electrical conduction between two modules. The wire harness is, for example, a wire.

Being bent in the specified plane means that: a bending portion of the hinge, during a process of bending the hinge, always remains in the specified plane and does not move out of the plane. The specified plane is a plane defined artificially in space, and three-dimensional movements of the hinge (i.e., the hinge is not fixed by other structures) in the plane are not restricted. The hinge is bent in the specified plane and is not twisted and bent in three dimensions, such that the possibility of the hinge 4 being wound and twisted or knotted is further reduced. It should be noted that it is an ideal situation that the bending portion of the hinge during the process of bending the hinge always remains in contact with the specified plane. In designing the hinge, due to the need to leave an amount of movement clearance when the hinge blocks are assembled and/or due to manufacturing errors of the hinge blocks, in the case that the hinge blocks are successively arranged, at least a portion of the hinge blocks are arranged gradually away from the specified plane. Because the hinge blocks are successively arranged slightly away from the specified plane, the hinges are not wound or knotted with each other. It should be understood that although at least some of the hinge blocks are successively arranged slightly away from the specified plane when the hinge is bent, the hinge is still considered to be bent in the specified plane.

In some practices, for two members that produce relative movement, corresponding functional modules on the two members need to be electrically connected by wires. However, when one of the members moves relative to the other member, the wires connected between the two functional modules are likely to be wound and twisted, knotted, or even clogged and jammed. To address this problem, the present disclosure provides the wire harness organizer structure. By configuring the wire harness to run through the hollow portion of the hinge, the bending of the wire harness is limited by the hinge, and the hinge is less prone to the problem of winding and knotting compared with the wire. At the same time, because the hinge is bent in the specified plane, it does not become twisted and wound in three-dimensional space. When one of two members connected to two ends of the hinge moves relative to the other member, the hinge elongates or retracts with the moving member, such that two ends of the wire harness are ensured to be normally connected to corresponding functional modules on the two members, and the moving member is free of any obstacle. Therefore, the wire harness organizer structure according to some embodiments of the present disclosure addresses the problem of twisting, knotting, or even clogging and jamming of the wires in some practices. Moreover, the hinge occupies little space and has a simple structure, and thus the design difficulty and cost of the wire harness organizer structure are reduced.

The wire harness organizer structure according to some embodiments of the present disclosure is applicable to any scenario where corresponding modules on two members moving relative to each other need to be electrically connected by wires and is applicable in particular to a display device, but the present disclosure is not limited to this. Specifically, referring to FIG. 1, the present disclosure further provides a display device. The display device includes a display panel (not illustrated in FIG. 1) and a stand 1 configured to support the display panel. A lifting structure configured to adjust a height of the display panel is up and down movably arranged on the stand 1. The lifting structure 2 is up and down movably connected to the stand 1 in various ways. For example, movable members are slidably connected to the stand 1 by members such as slide sliders, studs, and nuts, which is not limited herein.

Moreover, an electronic module (not illustrated in FIG. 1) is arranged in the stand 1, which is an electronic element assembly, such as a mainboard and an interface board, used to drive an operation of a screen, transmit signals, and display images. Because the electronic module is arranged outside the display panel, i.e., inside the stand 1, the electronic module needs to be connected to the functional modules in the display panel (e.g., a backlight, a low voltage differential signals, and a lens lamp) by a wire harness 3.

To avoid an occurrence of the problem of twisting, knotting, or even clogging and jamming of the wires in some practices during a process of lifting and lowering the display panel relative to the stand 1, some embodiments of the present disclosure employ the wire harness organizer structure according to the present disclosure. The wire harness organizer structure includes a hinge 4 with a hollow portion communicating a first end 41 of the hinge 4 to a second end 42. The wire harness 3 runs through the hollow portion. That is, the wire harness 3 runs into the hollow portion from one of the first end 41 and the second end 42 and then runs out of the hollow portion from the other of the first end 41 and the second end 42. In this way, the deformation of the wire harness 3 is restricted by the hinge 4, and the hinge 4 is not prone to being wound and twisted or knotted, such that the problem of twisting, knotting, or even clogging and jamming of the wire harness 3 is addressed.

Figure 2A:
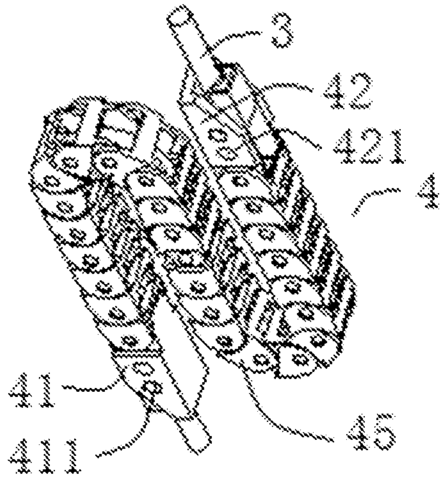
FIG. 2A is an assembly diagram of a wire harness organizer structure according to some embodiments of the present disclosure.
Figure 2B:
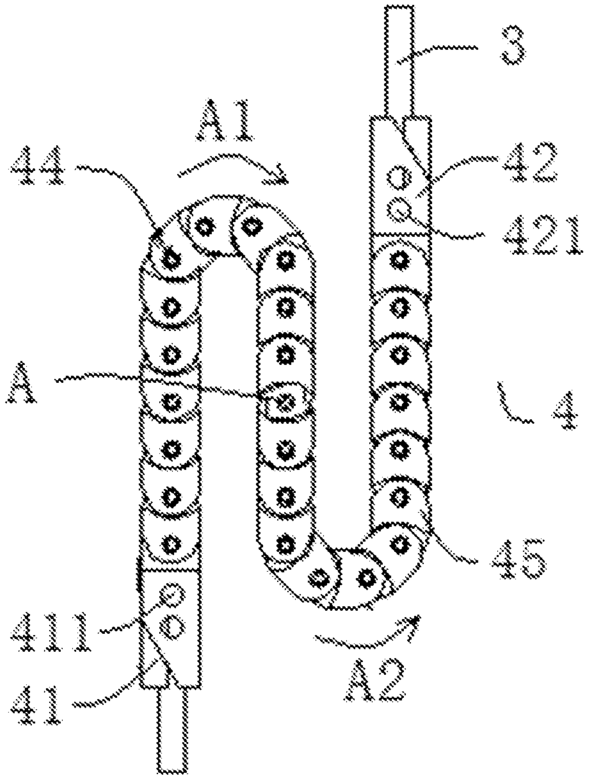
FIG. 2B is a front view of a wire harness organizer structure according to some embodiments of the present disclosure.
Figure 2C:
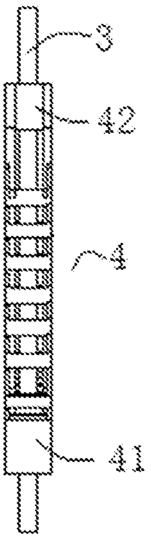
FIG. 2C is a side view of a wire harness organizer structure according to some embodiments of the present disclosure.

Moreover, the first end 41 of the hinge 4 is connected to the stand 1, and the second end 42 of the hinge 4 is connected to the lifting structure 2. For example, as illustrated in FIG. 2A to FIG. 2C, a fixing terminal is arranged on each of the first end 41 and the second end 42 of the hinge 4, and at least one mounting hole is arranged in the fixing terminal. For example, a mounting hole 411 is arranged in the fixing terminal of the first end 41, and a mounting hole 421 is arranged in the fixing terminal of the second end 42. As illustrated in FIG. 1, the wire harness organizer structure further includes fastening screws 43, and the number of fastening screws 43 is the same as the total number of mounting holes in all the fixing terminals. Each of the fastening screws 43 passes through each of the mounting holes in one-to-one correspondence and is connected to the stand 1 or the lifting structure 2 by threads. In practice, the first end 41 of the hinge 4 and the stand 1, and the second end 42 of the hinge 4 and the lifting structure 2 are connected to each other in other ways, such as snap-in, plug-in, welding, and the like.

The hinge 4 is bent in a specified plane and is able to elongate or retract with the raising and lowering of the lifting structure 2, such that the normal connection of the wire harness 3 is ensured (i.e., an effective connection between the electronic module and the functional module in the display panel is ensured), and the movement of the lifting structure 2 is free of any obstacle.

The hinge of the wire harness organizer structure of the display device according to some embodiments of the present disclosure addresses the problem of twisting, knotting, or even clogging and jamming of the wires in some practices, and the hinge occupies little space and has a simple structure, such that the design difficulty and cost of the wire harness organizer structure are reduced.

In some optional embodiments, an orthographic projection of the hollow portion on a cross portion of the hinge 4 is, for example, a square. A size of the square is, for example, 5 mm×5 mm. In this case, the hinge 4 is suitable for being run through by a wire harness 3 with an outer diameter of 5 mm or less. In practice, the orthographic projection of the hollow portion on the cross portion of the hinge 4 is circular, rectangular, or any other shape, which is not limited herein.

For the case where the hinge 4 elongates or retracts with the raising and lowering of the lifting structure 2, the specified plane is arranged to be parallel to a lifting direction of the lifting structure 2 (i.e., to be parallel to a Y direction in FIG. 1). For example, the specified plane is a plane where the Y direction and a Z direction in FIG. 1 are disposed.

In practice, the hinge 4 is bent in the specified plane in a variety of ways. For example, a hinge structure that is only bent in one plane is employed, or a corresponding structure is employed to restrict an accommodating space of the hinge. For example, a narrow space is employed to restrict the hinge, such that the hinge is avoided from being twisted and bent in the three-dimensional space.

In some optional embodiments, the hinge 4 in a most compressed state has a projection with a maximum area on a plane, and the projection is Z-shaped or S-shaped. For example, as illustrated in FIG. 1, an orthographic projection of the hinge 4 on a plane parallel to the Y direction and the Z direction is S-shaped. However, the shape of the projection is not limited herein.

In some optional embodiments, as illustrated in FIG. 1 and FIG. 2B, the first end 41 of the hinge 4 is a fixed end fixedly connected to the stand 1, and the second end 42 of the hinge 4 is a moving end fixedly connected to the lifting structure 2. A fixed portion 44 is arranged at a position at a specified length from the first end 41 of the hinge 4. The fixed portion is fixedly connected to the stand 1 to be able to be fixed relative to the first end 41 of the hinge 4. For example, as illustrated in FIG. 1, the stand 1 has a side wall (not illustrated in FIG. 1) on a side distal from the lifting structure 2, and the fixed portion 44 is fixedly connected to the side wall. Optionally, the fixed portion 44 is connected to the stand 1 in the same way as the first end 4.

In this case, a portion, between the fixed portion 44 and the first end 41, of the hinge 4 is a first portion, which is stationary during the process of raising and lowering the lifting structure 2 due to the fixed connections of both the fixed portion 44 and the first end 41 to the stand 1. A portion, between the fixed portion 44 and the second end 42, of the hinge 4 is a second portion, which is raised and lowered simultaneously with the lifting structure 2 due to the fixed connection between the second end 42 and the lifting structure 2. The second portion elongates or retracts during the process of raising and lowering the lifting structure 2. In this way, two ends of the wire harness 3 are ensured to be normally connected to corresponding functional modules, and at the same time, the lifting structure 2 is free of any obstacle.

Moreover, with the aid of the fixing portion 44, the second portion is defined to be bent in the specified plane, and the specified plane is parallel to the lifting direction of the lifting structure 2 (i.e., a movement direction of the second end 42 of the hinge 4). That is, the plane is parallel to the plane in which the Y direction and the Z direction are disposed in FIG. 1. Specifically, different segments of the hinge 4 are only bent in the same plane, that is, a plane in which the first portion is bent and a plane in which the second portion is bent are the same plane. Therefore, the plane in which the second portion is bent is defined by defining the plane in which the first portion is bent. Based on this, the plane in which the first portion is bent is defined by providing two fixed ends, i.e., the fixed portion 44 and the first end 41, at different positions of the hinge 4, such that the plane in which the second portion is bent is indirectly defined.

By configuring the second portion to be bent in the specified plane and the specified plane to be parallel to the lifting direction of the lifting structure 2, the movement of the second portion of the hinge 4 is limited to be within a vertical plane parallel to the lifting direction, elongating or retracting with the lifting and lowering of the lifting structure 2, such that the hinge 4 is prevented from being twisted and bent in the three-dimensional space, and thus the hinge 4 is prevented from being wound and twisted or knotted.

It should be noted that a position of the fixed portion 44 relative to the first end 41 of the hinge 4 determines an extension direction of the first portion of the hinge 4, which is defined according to the movement direction of the second end 42 of the hinge 4. Specifically, the extension direction of the first portion of the hinge 4 preferably satisfies: it enables all of the second portion of the hinge 4 to be disposed on the same side of the first portion of the hinge 4 in the case that the second portion is retracted to the most compressed state. Because the hinge 4 is bent in the same plane, a bending shape of the second portion of the hinge 4 is defined if the second portion is bent on the same side of the first portion, such that the hinge 4 is further prevented from being wound and twisted or knotted.

In some optional embodiments, an included angle between the extension direction of the first portion of the hinge 4 and the movement direction of the second end 42 of the hinge 4 is greater than or equal to 0° and is less than or equal to 90°. For example, as illustrated in FIG. 2B, the included angle between the extension direction of the first portion of the hinge 4 and the movement direction of the second end 42 of the hinge 4 is 0°. That is, the extension direction of the first portion is parallel to a vertical direction of FIG. 2B. In this case, as the lifting structure 2 lowers, the second portion retracts and bends and is disposed on a right side of the first portion in FIG. 2B, forming an "S" shape or a "Z" shape together with the first portion. In addition, an overall space occupied by the hinge 4 is saved by defining the extension direction of the first portion to be parallel to the vertical direction of FIG. 2B.

In some embodiments, the included angle between the extension direction of the first portion of the hinge 4 and the movement direction of the second end 42 of the hinge 4 is 90°. That is, the extension direction of the first portion is perpendicular to the vertical direction of FIG. 2B. In this case, as the lifting structure 2 lowers, the second portion also retracts and bends and is disposed on an upper side of the first portion, forming an "S" shape or a "Z" shape together with the first portion. A difference only lies in that a placement direction of the bending shape of the retracted hinge in the embodiments is different from that of the retracted hinge 4 in FIG. 2B. In practice, the included angle between the extension direction of the first portion of the hinge 4 and the movement direction of the second end 42 of the hinge 4 is designed to be any angle within the range of 0° to 180° according to actual needs, which is not limited herein.

Based on the above embodiments, the bending shape of the hinge 4 upon retraction varies depending on a length of the hinge 4. For example, a longer hinge 4 is bent to form a multiple "S" shape or an irregular zigzag shape upon retraction, while a shorter hinge 4 is bent to form a "U" shape upon retraction.

In some optional embodiments, the hinge 4 includes a first segment and a second segment. That is, the hinge 4 is divided into at least two segments, and a connection position between the first segment and the second segment is disposed in the second portion. The first segment is unidirectionally bent along a first direction in the specified plane, and the second segment is unidirectionally bent along a second direction in the specified plane, wherein the second direction is opposite to the first direction. The first segment and the second segment are directly connected or indirectly connected, such as connected by other segments. For example, as illustrated in FIG. 2B, the hinge 4 is divided into two segments at a position A on the second portion. The first segment is a portion between the position A and the first end 41, and the second segment is a portion between the position A and the second end 42. The first segment is arranged to be unidirectionally bent in the specified plane along the first direction A1, and the second segment is arranged to be unidirectionally bent in the specified plane along the second direction A2. In this way, the hinge 4 is further prevented from being wound and twisted or knotted.

Optionally, the first segment is restricted to be bent along the second direction A2 in the specified plane, and the second segment is restricted to be bent along the first direction A1 in the specified plane. By configuring the first segment and the second segment to be bent along opposite directions, the entire hinge 4 is bent to form an "S" or "Z" shape. Restricting the first segment to be bent along the second direction A2 in the specified plane is understood as the bending degree of the first segment along the second direction A2 in the specified plane is substantially smaller than the bending degree of the first segment along the first direction A1 in the specified plane, or the first segment is not bent along the second direction A2 in the specified plane. Restricting the second segment to be bent along the first direction A1 in the specified plane is understood as the corresponding explanation, which is not repeated herein.

During the process of raising the lifting structure 2, the second segment gradually unfolds, and the overall hinge 4 is in the most stretched state in the case that the lifting structure 2 is raised to its highest point. During the process of lowering the lifting structure 2, the second portion gradually retracts, and the overall hinge 4 is in the most compressed state in the case that the lifting structure 2 is lowered to its lowest point. In the case that the hinge 4 is in the most compressed state, the hinge 4 occupies the least space, which is crouched in the internal space of the stand 1, and at the same time, an orderly arrangement of the wire harness 3 is maintained, such that the problem of twisting, knotting, or even clogging and jamming of the wires in some practices is addressed. The most stretched and compressed states refer to the most stretched and compressed states which the hinge achieves when limited by the stand 1 and the lifting structure 2. It should be understood that the most stretched or compressed state is not the stretch limit or compression limit of the hinge 4.

In some optional embodiments, a length of the first portion is greater than or equal to one-third of a length of the second portion and less than or equal to one-half of the length of the second portion. In this way, the hinge 4 has a sufficient length to elongate or retract with the lifting structure 2, and the hinge 4 occupying a large space due to the second portion being too long is avoided, or the second portion not being able to retract to the same side of the first portion is avoided.

In some optional embodiments, the length of the hinge 4 ranges from 150 mm to 180 mm, which meets a requirement of the length of the hinge during a process of raising and lowering a display of 19 inches to 32 inches.

Figure 3:
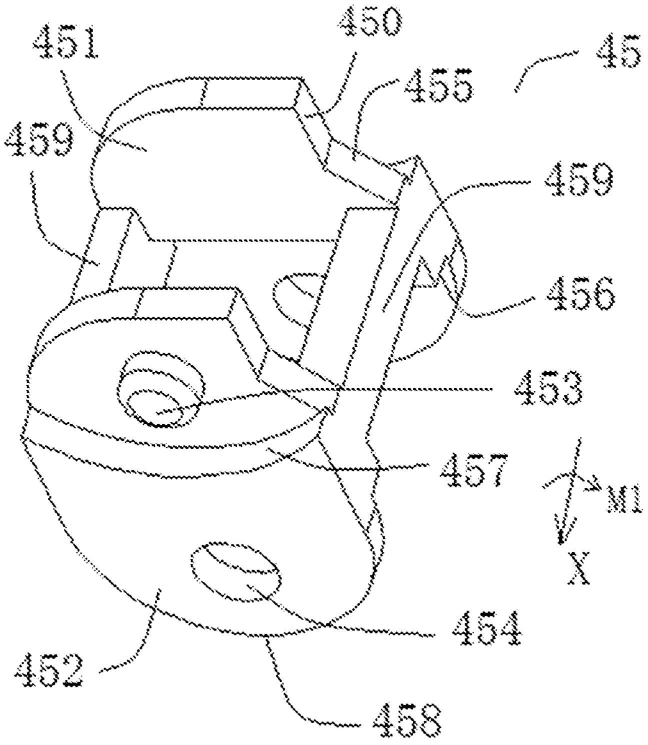
FIG. 3 is a structural diagram of a hinge block employed in some embodiments of the present disclosure.

The hinge 4 has various specific structures. For example, in the embodiments, the hinge 4 includes a plurality of hinge blocks 45 successively connected in series. As illustrated in FIG. 3, each of the hinge blocks 45 includes a first hinge sub-block 451 and a second hinge sub-block 452 connected as one. In any adjacent three hinge blocks 45, the first hinge sub-block 451 of the middle hinge block 45 and the second sub-singe block 452 of one of the adjacent three hinge blocks 45 adjacent to the middle hinge block 45 are rotatably connected to each other in the specified plane, and the second hinge sub-block 452 of the middle hinge block 45 and the first hinge sub-block 451 of the other hinge block 45 adjacent the middle hinge block 45 are rotatably connected to each other in the specified plane. Thus, any adjacent three hinge blocks 45 are successively rotatably connected in the specified plane, such that the hinge bendable in the specified plane is formed. It should be readily understood that axes around which the corresponding first hinge sub-block 451 and second hinge sub-block 452 rotate are perpendicular to the specified.

Figure 4A:
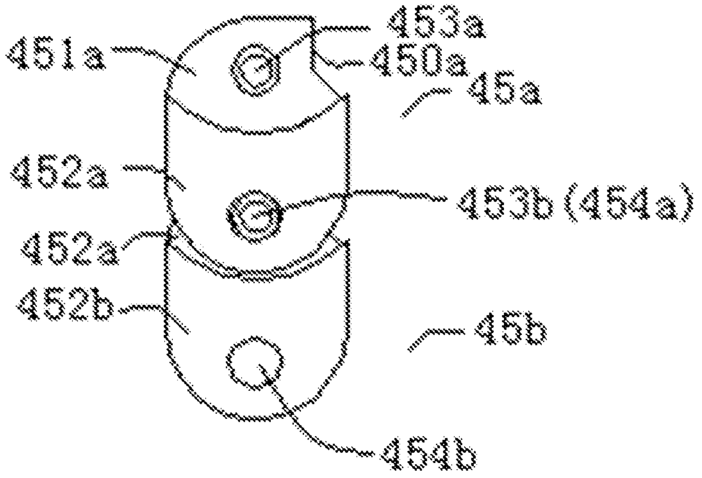
FIG. 4A is a connection front view of any two hinge blocks employed in some embodiments of the present disclosure.
Figure 4B:
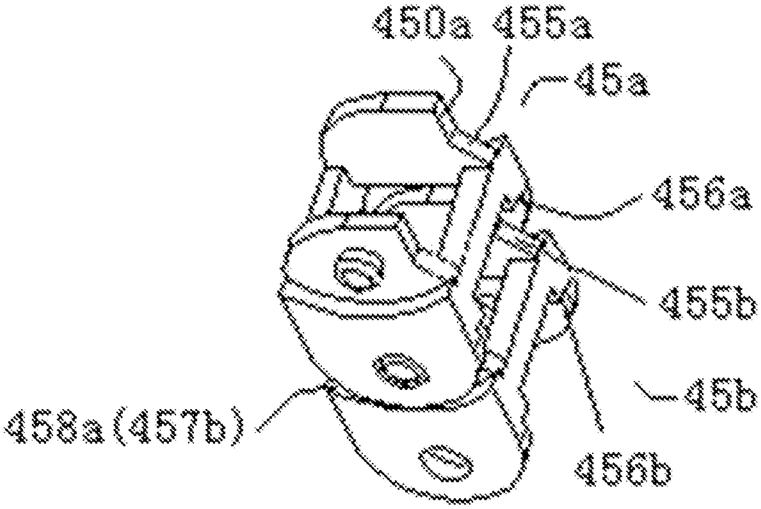
FIG. 4B is a stereogram of any two hinge blocks employed in some embodiments of the present disclosure.

In some optional embodiments, as illustrated in FIG. 3, for each of the hinge blocks 45, a rotation shaft portion 453 is arranged on one of the first hinge sub-block 451 and the second hinge sub-block 452, and a rotation shaft hole 454 is arranged in the other of the first hinge sub-block 451 and the second hinge sub-block 452. The rotation shaft portion 453 is rotatably connected to a corresponding rotation shaft hole 454. An axis of the rotation shaft portion 453 is perpendicular to the specified plane. For example, as illustrated in FIG. 4A and FIG. 4B, in any adjacent two hinge blocks (45*a*, 45*b*), a rotation shaft hole 454*a* on the hinge block 45*a* is rotatably connected to a rotation shaft portion 453*b* on the hinge block 45*b*, a rotation shaft portion 453*a* on the hinge block 45*a* is rotatably connected to a rotation shaft hole 454 on another hinge block (not illustrated in the figures) adjacent thereto, and a rotation shaft hole 454*b* on the hinge block 45*b* is rotatably connected to a rotation shaft portion 453 on another hinge block (not illustrated in the figures) adjacent thereto.

In some optional embodiments, as illustrated in FIG. 3, for each of the hinge blocks 45, a first limiting portion is arranged on one of the first hinge sub-block 451 and the second hinge sub-block 452, and a second limiting portion is arranged on the other of the first hinge sub-block 451 and the second hinge sub-block 452. The first limiting portion cooperates with the corresponding second limiting portion to define a maximum angular extent to which adjacent two hinge blocks rotate about the axis of the rotation shaft portion 453 in the specified plane. In other words, under the cooperation of the first limiting portion and the corresponding second limiting portion, the adjacent two hinge blocks fail to continue to rotate upon reaching the maximum angular extent. Specifically, the rotation between adjacent two hinge blocks is defined to have an initial state, and the initial state is defined as a rotation shaft hole in a hinge block, a rotation shaft portion on the hinge block, and a rotation shaft hole in another hinge block are in a common line. For example, in the case that the rotation shaft hole 454*a* on the hinge block 45*a*, the rotation shaft portion 453*a* on the hinge block 45*a*, and the rotation shaft hole 454*b* on the hinge block 45*b* are in a common line, there is an initial state of the rotation between the hinge block 45*a* and the hinge block 45*b* in FIG. 4A. As illustrated in FIG. 3 and FIG. 4A, assuming that an X direction is a direction in which the axis of the rotation shaft portion 453 is disposed, an M1 direction is a direction in which adjacent two hinge blocks rotate from the initial state to the maximum angular extent when the adjacent two hinge blocks rotate about the axis of the rotation shaft portion 453 in the specified plane. An angle between the adjacent hinge block 45*a* and hinge block 45*b* is defined as a complementary angle of an included angle between a line between the rotation shaft hole 454*a* on the hinge block 45*a* and the rotation shaft portion 453*a* on the hinge block 45*a* and a line between the rotation shaft hole 454*a* on the hinge block 45*a* and the rotation shaft hole 454*b* on the hinge block 45*b* (the included angle is 180° in the initial state).

Figure 5:
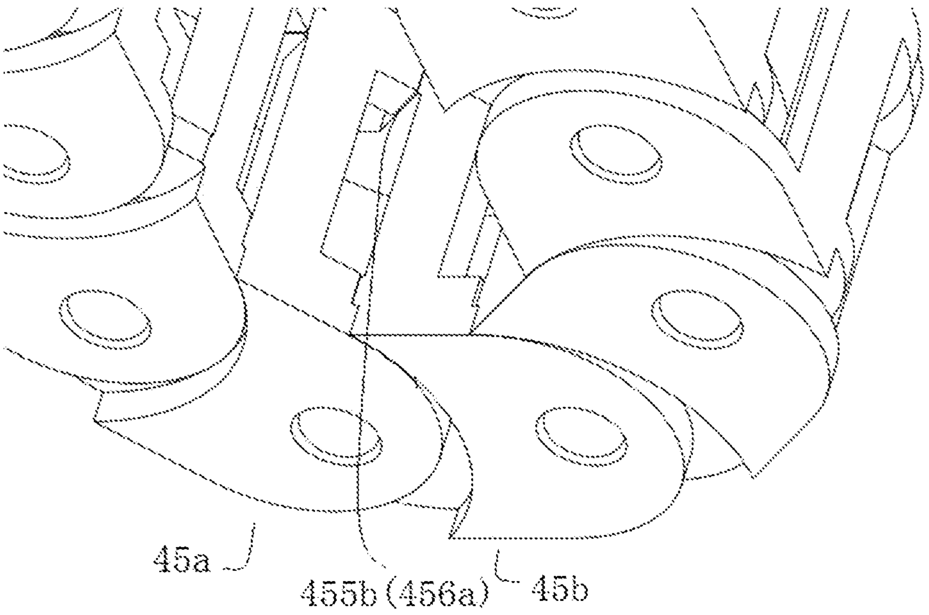
FIG. 5 is a partially enlarged diagram of a hinge employed in some embodiments of the present disclosure.

The first limiting portion and the second limiting portion have various structures. For example, as illustrated in FIG. 3, the first limiting portion is a first limiting surface 455 on one of the first hinge sub-block 451 and the second hinge sub-block 452, and the second limiting portion is a second limiting surface 456 on the other of the first hinge sub-block 451 and the second hinge sub-block 452. For example, in FIG. 3, the first limiting surface 455 is disposed on the first hinge sub-block 451 and the second limiting surface 456 is disposed on the second hinge sub-block 452. Specifically, as illustrated in FIG. 5, in any adjacent two hinge blocks (45*a*, 45*b*), a second limiting surface 456*a* of the hinge block 45*a* is in contact and cooperates with a first limiting surface 455*b* of the hinge block 45*b*. In the case that the two surfaces are in contact, the adjacent two hinge blocks rotate to a maximum angular extent along the M1 direction and fail to continue to rotate along the M1 direction. Therefore, it is possible to define the maximum angular extent to which the adjacent two hinge blocks rotate along the M1 direction. In practice, an included angle between the first limiting surface 455 and the second limiting surface 456 is freely defined according to the desired maximum angle at which the adjacent two hinge blocks rotate. In some embodiments, the maximum angle is defined between 20° and 90°, which prevents the hinges from being wound and twisted or knotted while avoiding damage to the conductive wire harnesses caused by being bent at a large angle. Preferably, the maximum angle is defined between 40° and 50°. Further, preferably, the maximum angle is defined to be 45°.

By limiting the maximum angular extent to which any adjacent two hinge blocks 45 rotate in the specified plane, the hinge 4 is further prevented from being wound and twisted, stacked, or clogged and jammed.

In some optional embodiments, as illustrated in FIG. 3, adjacent two hinge blocks rotate within an angular range in the specified plane. Specifically, a third limiting surface 450 is arranged on the first hinge sub-block 451. During a process that the second hinge sub-block 452 adjacent to the first hinge sub-block 451 rotates along a direction opposite to the M1 direction, when the third limiting surface 450 is against an inner side (not illustrated in FIG. 3), which is adjacent to the second limiting surface 456 and on the second hinge sub-block 452, the second hinge sub-block 452 fails to continue to rotate along the direction opposite to the M1 direction. Specifically, as illustrated in FIG. 4A and FIG. 4B, in any adjacent two hinge blocks (45*a*, 45*b*), a third limiting surface 450*a* on the hinge block 45*a* is capable of being against an inner side, which is adjacent to the second limiting surface 456 and on the other hinge block (not illustrated in the figures) adjacent to the hinge block 45*a*. When the two surfaces are against, the first hinge sub-block 451 and the second hinge sub-block 452 fail to continue to rotate in the direction opposite to the M1 direction. Preferably, an angle at which the first hinge sub-block 451 and the second hinge sub-block 452 rotate along the direction opposite to the M1 direction from the initial state is smaller than an angle at which the first hinge sub-block 451 and the second hinge sub-block 452 rotate along the M1 direction from the initial state. In the case that the rotation direction is different, the degree of limitation is different. In this way, the hinge 4 is effectively prevented from being wound and twisted or knotted. Preferably, the adjacent two hinge blocks (45*a*, 45*b*) reach only the initial state when rotating along the direction opposite to the direction of M1, and fail to continue to be bent, such that the unidirectionally bending of the adjacent two hinge blocks in the specified plane is achieved, and thus the hinge 4 is further prevented from being wound and twisted or knotted.

Figure 6A:
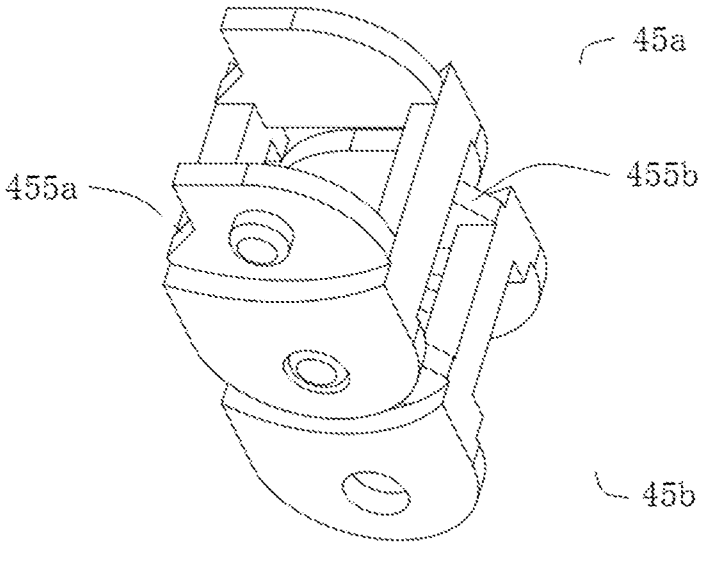
FIG. 6A is a connection structural diagram of a hinge block of a first segment and a hinge block of a second segment of a hinge employed in some embodiments of the present disclosure.
Figure 6B:
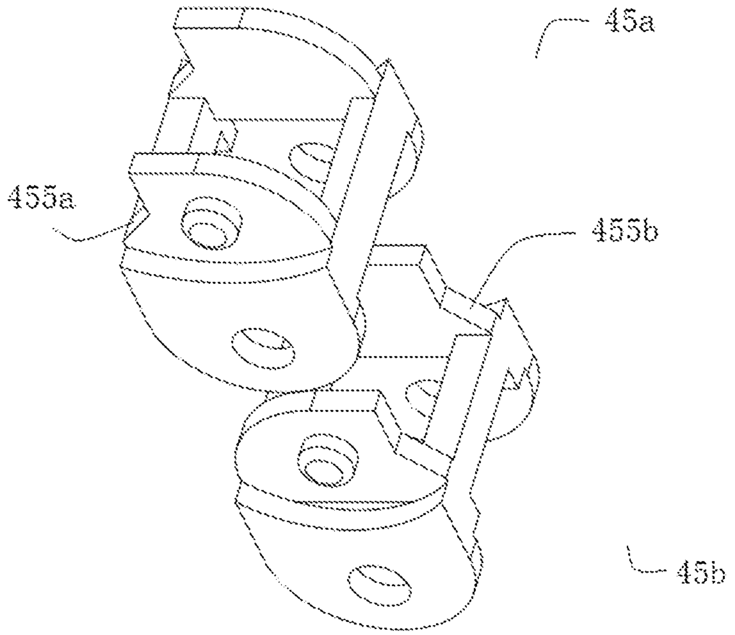
FIG. 6B is a breakdown structure diagram of a hinge block of a first segment and a hinge block of a second segment of a hinge employed in some embodiments of the present disclosure.

Further, as illustrated in FIG. 2B, to achieve that the hinge 4 as a whole is bent in the specified plane along both the first direction A1 and the second direction A2, the hinge 4 is divided into two segments at a position A on the second portion. The position A is selected at any position on the second portion other than two ends thereof according to the specific bending situation of the hinge 4. The first segment is arranged to be unidirectionally bent along the first direction A1 in the specified plane, and the second segment is arranged to be unidirectionally bent along the second direction A2 in the specified plane. In this case, as illustrated in FIG. 6A and FIG. 6B, the hinge block 45*a* on one of the first sub-segment and the second sub-segment is reversely connected to the hinge block 45*b* on the other of the first sub-segment and the second sub-segment. For example, a first limiting surface 455*a* of the hinge block 45*a* and a first limiting surface 455*b* of the hinge block 45*b* respectively face opposite directions. Moreover, these two hinge blocks are still rotatably connected by the rotation shaft portion and the rotation shaft hole in the same way as other hinge blocks. In this way, in one aspect, the hinge is further prevented from being wound and twisted, stacked, and stuck by configuring each segment only to be unidirectionally bent, and in another aspect, the hinge 4 is bent in two directions as a whole, such that the hinge is ensured to elongate or retract with the movement of the lifting structure 2, and thus two ends of the wire harness are ensured to be normally connected to the corresponding functional modules on the two members while ensuring that the moving members are free of any obstacle.

In some optional embodiments, as illustrated in FIG. 3, for each of the hinge blocks 45, the first hinge sub-block 451 includes two first walls (e.g., sheet sidewalls) opposite to each other along a direction parallel to the axis direction of the rotation shaft portion 453 (i.e., a direction parallel to the X direction in FIG. 3). The second hinge sub-block 452 includes two second walls (e.g., sheet sidewalls) opposite to each other along the direction parallel to the axis direction of the rotation shaft portion 453. The two first walls of the first hinge sub-block 451 are respectively connected as one to the two second walls of the second hinge sub-block 452. Each of the hinge blocks 45 further includes two connection portions 459 which are connected between the two first walls and the two second walls, such that the two first walls and the two second walls form an integral structure. Optionally, the two connection portions 459 are spaced apart at two edges of the two first walls and the two second walls along a direction perpendicular to the X direction, and the hollow portion, configured for accommodating the wire harness 3, is formed between the two first walls, the two second walls, and the two connection portions 459. The two first walls, two second walls, and the two connection portions 459 are capable of limiting the position of the wire harness 3 in their respective directions, such that the wire harness 3 is prevented from prolapsing.

In some optional embodiments, for each of the hinge blocks 45, a surface, going away from the other first wall, of one of the first walls of the first hinge sub-block 451 is a first surface (i.e., an outer surface, going away from the hollow portion, of each first wall), and a surface, going away from the other second wall, of one of the second walls of the second hinge sub-block 452 is a second surface (i.e., an outer surface, going away from the hollow portion, of each second wall). The second surface of one of two second walls protrudes, relative to the first surface of the first wall to which the second wall is connected as one, along a direction away from the first surface. For example, viewed as a whole, as illustrated in FIG. 3, an outer surface (i.e., the second surface), going away from the hollow portion, of the second hinge sub-block 452 protrudes relative to an outer surface (i.e., the first surface), going away from the hollow portion, of the first hinge sub-block 451 to form a step, and an upper surface of the step is an arc-shaped concave surface 457.

Further, in any adjacent two hinge blocks 45, the second surface of the second wall of one of the hinge blocks 45 is flush with the second surface of the second wall of the other hinge block. Viewed as a whole, as illustrated in FIG. 4B, the outer surface (i.e., the second surface), going away from the hollow portion, of the second hinge sub-block 452 of the hinge block 45*a* is flush with the outer surface (i.e., the second surface), going away from the hollow portion, of the second hinge sub-block 452 of the hinge block 45*b* adjacent to the hinge block 45*a*. In addition, the rotation shaft hole 454 is a through-hole opened through the second wall along the axis direction of the rotation shaft portion 453, and the rotation shaft portion 453 is a convex portion on the first surface of the first wall. The through-hole and the convex portion cooperate and are connected to each other. Thus, the hinge 4 forms smooth and complete sides as a whole.

In some optional embodiments, as illustrated in FIG. 3, for each of the hinge blocks 45, the second wall of each of the second hinge sub-blocks 452 has an arc-shaped concave surface 457 and an arc-shaped convex surface 458 that are going away from each other. As illustrated in FIG. 4B, in any adjacent two hinge blocks (45*a*, 45*b*), an arc-shaped convex surface 458*a* of the second wall of one of the hinge blocks 45*a* and an arc-shaped convex surface 458*a* of the second wall of the other hinge block 45*b* cooperate together. In this way, the rotation of any adjacent two hinge blocks (45*a*, 45*b*) is guided.

In some optional embodiments, for each of the hinge blocks, a surface, going away from the other first wall, of one of the first walls is a first surface, and a surface, going away from the other second wall, of one of the second walls is a second surface. The first surface of one of the first walls protrudes, relative to the second surface of the second wall to which the first wall is connected as one, in a direction away from the second surface. In any adjacent two hinge blocks, the first surface of the first wall of one of the hinge blocks is flush with the first surface of the first wall of the other hinge block, the rotation shaft hole is a through-hole opened through the first wall along the axis direction of the rotation shaft portion, and the rotation shaft portion a convex portion on the second surface of the second wall. Optionally, each of the first walls has an arc-shaped concave surface and an arc-shaped convex surface that are going away from each other. In any adjacent two hinge blocks, the arc-shaped concave surface of the first wall of one of the hinge blocks cooperates with the arc-shaped convex surface of the first wall of the other hinge block.

The display device according to some embodiments of the present disclosure is caused to address the problem of twisting, knotting, or even clogging and jamming of the wires by using the wire harness organizer structure according to some embodiments of the present disclosure, and the wire harness organizer structure occupies little space and has a simple structure, which reduces the design difficulty and cost.

It should be understood that described above are merely exemplary embodiments to illustrate the principle of the present disclosure; however, the present disclosure is not limited to this. Therefore, any modifications and improvements made by those skilled in the art within the spirit and principles of the present disclosure shall be included in the protection scope of the present disclosure.

The technical solutions according to the embodiments of the present disclosure achieve at least the following beneficial effects.

The wire harness organizer structure according to the present disclosure is provided with the hinge bendable in the specified plane, and the wire harness used for electrical conduction runs through the hollow portion, communicating the first end to the second end, of the hinge, such that the hinge is used to restrict the bending of the wire harness, and the hinge is less prone to being wound and twisted or knotted than a separate wire. At the same time, because the hinge is bendable in the specified plane, the hinge is not twisted and bent in three dimensions. Moreover, in the case that one of the two members connected to the two ends of the hinge moves relative to the other, the hinge elongates or retracts with the moving member, such that the two ends of the wire harness are ensured to be normally connected to the corresponding functional modules on the two members, and the moving member is free of any obstacle. Thus, the wire harness organizer structure according to the present disclosure addresses the problem of twisting, knotting, or even clogging and jamming of the wires in some practices, and the hinge occupies little space and has a simple structure, which reduces the design difficulty and cost of the wire harness organizer structure.

The display device according to the present disclosure, by employing the wire harness organizer structure according to the present disclosure, addresses the problem of twisting, knotting, or even clogging and jamming of the wires in some practices, and the hinge occupies little space and has a simple structure, which reduces the design difficulty and cost of the wire harness organizer structure.

What is claimed is:

1. A wire harness organizer structure, comprising a hinge and a wire harness configured for electrical conduction; wherein the hinge is bendable in a specified plane and has a hollow portion communicating a first end of the hinge to a second end of the hinge, and the wire harness runs through the hollow portion;

wherein the first end of the hinge is a fixed end, the second end of the hinge is a moving end, and a fixed portion is arranged at a position, at a specified length from the first end, of the hinge, the fixed portion being immovable relative to the first end; wherein a portion, between the fixed portion and the first end, of the hinge is a first portion, a portion, between the fixed portion and the second end, of the hinge is a second portion, and the fixed portion is configured to define the second portion to be bent in the specified plane, the specified plane being parallel to a movement direction of the second end of the hinge;

wherein the hinge comprises a first segment and a second segment, wherein a connection position between the first segment and the second segment is disposed in the second portion, the first segment is unidirectionally bent in the specified plane along a first direction, and the second segment is unidirectionally bent in the specified plane along a second direction, the second direction being opposite to the first direction.

2. The wire harness organizer structure according to claim 1, wherein an included angle between an extension direction of the first segment and the movement direction of the second end of the hinge is greater than or equal to 0° and is less than or equal to 90°.

3. The wire harness organizer structure according to claim 1, wherein a length of the first portion is greater than or equal to one-third of a length of the second portion and is less than or equal to one-half of the length of the second portion.

4. The wire harness organizer structure according to claim 1, wherein the hinge, in a most compressed state, has a projection with a maximum area on a plane, and the projection is Z-shaped or S-shaped.

5. The wire harness organizer structure according to claim 1, wherein a length of the hinge ranges from 150 mm to 180 mm.

6. The wire harness organizer structure according to claim 1, wherein the hinge comprises a plurality of hinge blocks successively connected in series, each of the hinge blocks comprising a first hinge sub-block and a second hinge sub-block connected as one;

wherein in any adjacent three of the hinge blocks, the first hinge sub-block of the hinge block in the middle and the second hinge sub-block of one of the adjacent three hinge blocks adjacent to the hinge block in the middle are rotatably connected to each other in the specified plane, and the second hinge sub-block of the hinge block in the middle and the first hinge sub-block of the other hinge block adjacent to the hinge block in the middle are rotatably connected to each other in the specified plane.

7. The wire harness organizer according to claim 6, wherein for each of the hinge blocks, a rotation shaft portion is arranged on one of the first hinge sub-block and the second hinge sub-block, and a rotation shaft hole is arranged in the other of the first hinge sub-block and the second hinge sub-block, the rotation shaft portion being rotatably connected to the corresponding rotation shaft hole and an axis of the rotation shaft portion being perpendicular to the specified plane.

8. The wire harness organizer structure according to claim 7, wherein for each of the hinge blocks, a first limiting portion is arranged on one of the first hinge sub-block and the second hinge sub-block, and a second limiting portion is arranged on the other of the first hinge sub-block and the second hinge sub-block, wherein the first limiting portion cooperates with the corresponding second limiting portion to define a maximum angular extent to which adjacent two of the hinge blocks rotate about the axis of the rotation shaft portion in the specified plane.

9. The wire harness organizer structure according to claim 8, wherein an angle at which two adjacent of the hinge blocks rotate about the axis of the rotation shaft portion in the specified plane from an initial state toward the maximum angular extent is greater than an angle at which the two adjacent hinge blocks rotate about the axis of the rotation shaft portion in the specified plane toward a direction going away from the maximum angular extent.

10. The wire harness organizer structure according to claim 8, wherein the first limiting portion is a first limiting surface on one of the first hinge sub-block and the second hinge sub-block, and the second limiting portion is a second limiting surface on the other of the first hinge sub-block and the second hinge sub-block.

11. The wire harness organizer structure according to claim 8, wherein for each of the hinge blocks, the first hinge sub-block comprises two first walls opposite to each other along a direction parallel to the axis of the rotation shaft portion, and the second hinge sub-block comprises two second walls opposite to each other along the direction parallel to the axis of the rotation shaft portion, the two first walls being respectively connected as one to the two second walls; and each of the hinge blocks further comprises two connection portions connected between the two first walls and the two second walls, and the hollow portion is formed between the two connection portions, the two first walls, and the two second walls.

12. The wire harness organizer structure according to claim 11, wherein for each of the hinge blocks, a surface, going away from the other first wall, of one of the first walls is a first surface, and a surface, going away from the other second wall, of one of the second walls is a second surface, wherein the second surface of one of the second walls protrudes, relative to the first surface of the first wall connected as one to the second wall, along a direction away from the first surface;

in any adjacent two of the hinge blocks, the second surface of the second wall of one of the hinge blocks is flush with the second surface of the second wall of the other hinge block; and the rotation shaft hole is a through-hole opened through the second wall along a direction of the axis of the rotation shaft portion, and the rotation shaft portion is a convex portion on the first surface of the first wall.

13. The wire harness organizer structure according to claim 12, wherein each of the second walls has an arc-shaped concave surface and an arc-shaped convex surface that are going away from each other, wherein in any adjacent two of the hinge blocks, the arc-shaped concave surface of the second wall of one of the hinge blocks cooperates with the arc-shaped convex surface of the second wall of the other hinge block.

14. The harness organizer structure according to claim 11, wherein for each of the hinge blocks, a surface, going away from the other first wall, of one of the first walls is a first surface, and a surface, going away from the other second wall, of one of the second walls is a second surface, wherein the first surface of one of the first walls protrudes, relative to the second surface of the second wall connected as one to the first wall, along a direction away from the second surface;

in any adjacent two of the hinge blocks, the first surface of the first wall of one of the hinge blocks is flush with the first surface of the first wall of the other hinge block; and the rotation shaft hole is a through-hole opened through the first wall along a direction of the axis of the rotation shaft portion, and the rotation shaft portion is a convex portion on the second surface of the second wall.

15. The wire harness organizer structure according to claim 14, wherein each of the first walls has an arc-shaped concave surface and an arc-shaped convex surface that are going away from each other, wherein in any adjacent two of the hinge blocks, the arc-shaped concave surface of the first wall of one of the hinge blocks cooperates with the arc-shaped convex surface of the first wall of the other hinge block.

16. A display device, comprising a display panel and a stand configured to support the display panel, wherein a lifting structure configured to adjust a height of the display panel is up and down movably arranged on the stand, and an electronic module is arranged in the stand;

wherein the display device further comprises a wire harness organizer structure; wherein the wire harness organizer structure comprises a hinge and a wire harness configured for electrical conduction; wherein the hinge is bendable in a specified plane and has a hollow portion communicating a first end of the hinge to a second end of the hinge, and the wire harness runs through the hollow portion;

wherein the first end of the hinge is a fixed end, the second end of the hinge is a moving end, and a fixed portion is arranged at a position, at a specified length from the first end, of the hinge, the fixed portion being immovable relative to the first end; wherein a portion, between the fixed portion and the first end, of the hinge is a first portion, a portion, between the fixed portion and the second end, of the hinge is a second portion, and the fixed portion is configured to define the second portion to be bent in the specified plane, the specified plane being parallel to a movement direction of the second end of the hinge;

wherein the hinge comprises a first segment and a second segment, wherein a connection position between the first segment and the second segment is disposed in the second portion, the first segment is unidirectionally bent in the specified plane along a first direction, and the second segment is unidirectionally bent in the specified plane along a second direction, the second direction being opposite to the first direction; and the electronic module is electrically connected to a functional module in the display panel by a wire harness, and the first end of the hinge is connected to the stand and the second end of the hinge is connected to the lifting structure.

17. The display device according to claim 16, wherein fixing terminals are arranged on the first end and second end of the hinge, at least one mounting hole being arranged in each of the fixing terminals, and the wire harness organizer structure further comprises fastening screws, a number of the fastening screws being equal to a total number of the mounting holes in all the fixing terminals, and each of the fastening screws running through the mounting hole in one-to-one correspondence and being connected to the stand or the lifting structure by threads.

* * * * *